Nov. 20, 1962        H. J. THOMAS        3,064,846

VEHICLE CLOSURE CHECK AND SUPPORT MEANS

Filed Nov. 6, 1958        3 Sheets-Sheet 1

INVENTOR.
Herman J. Thomas
BY Herbert Furman
ATTORNEY

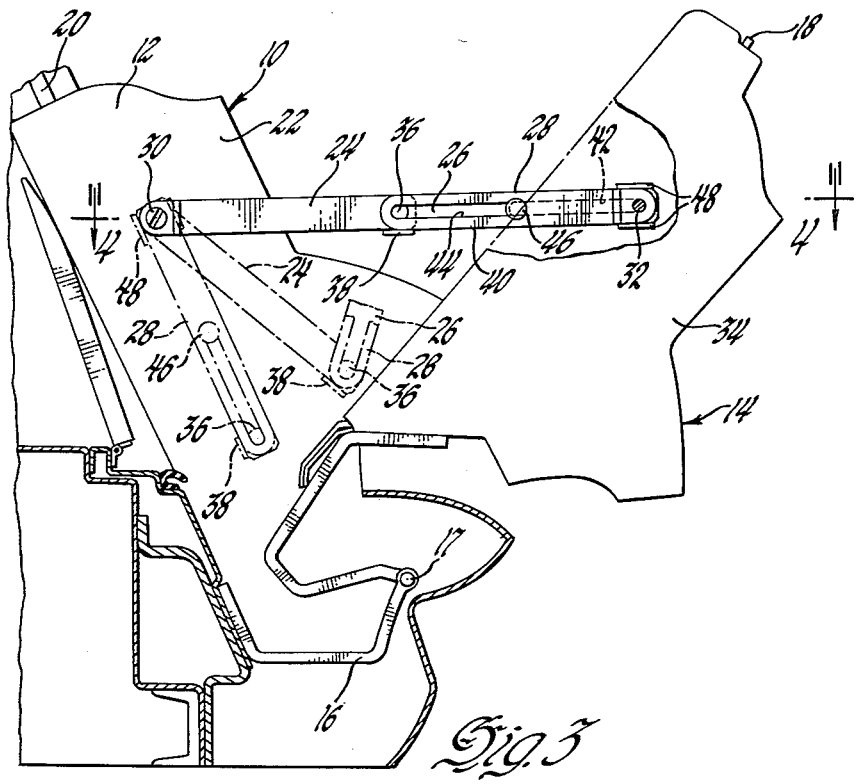
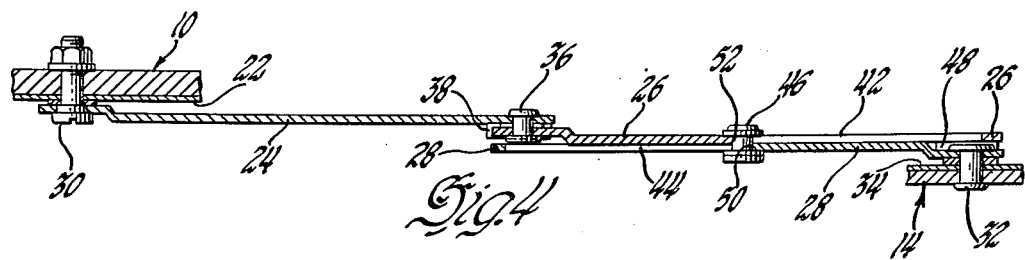

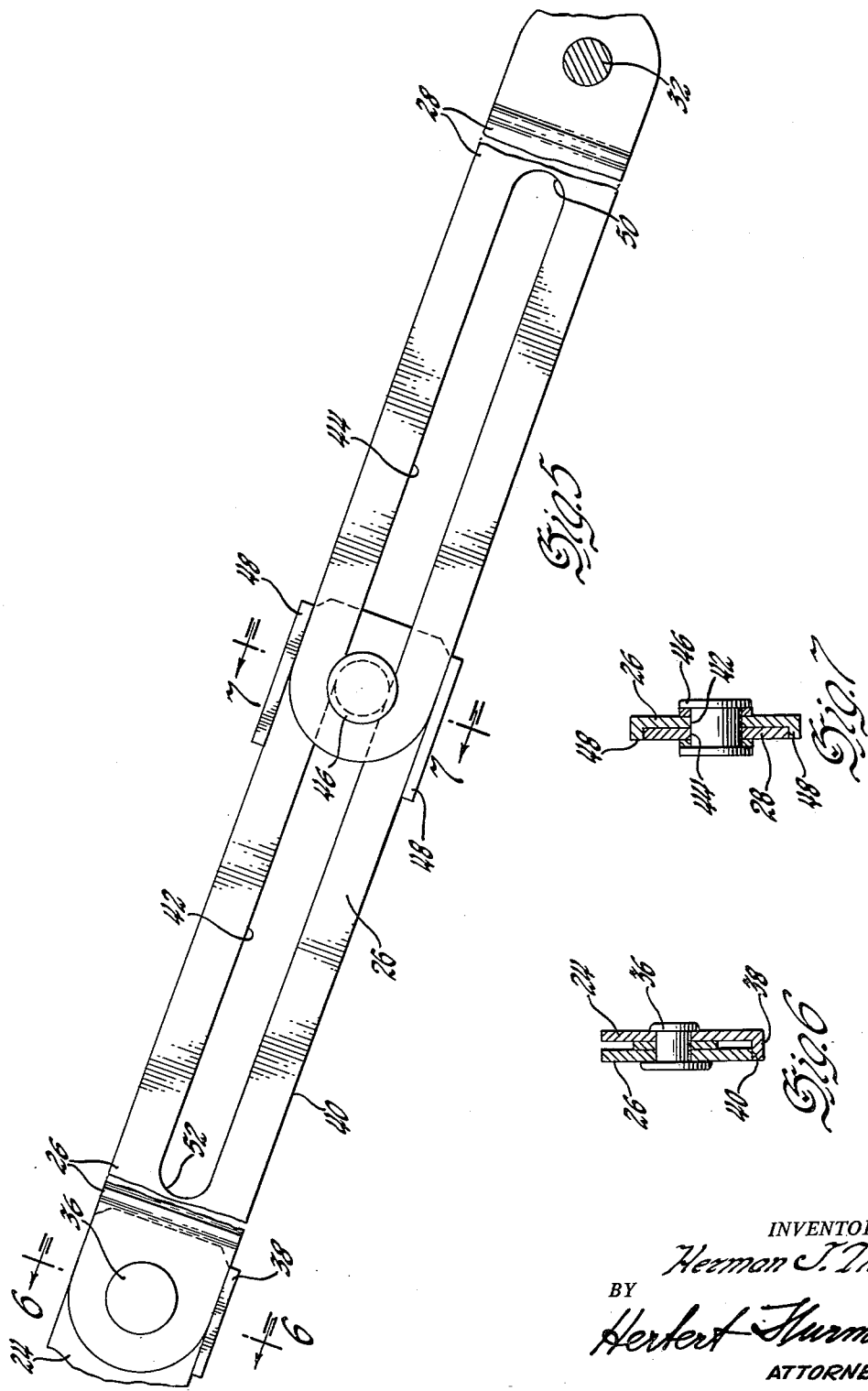

3,064,846
VEHICLE CLOSURE CHECK AND SUPPORT MEANS
Herman J. Thomas, Roseville, Mich., assignor to General Motors Corporation, Detroit, Mich., a corporation of Delaware
Filed Nov. 6, 1958, Ser. No. 772,265
3 Claims. (Cl. 217—60)

This invention relates to vehicle closure check and support means and more particularly to a check and support means for a swingable vehicle closure.

Many current production station wagons include a vertically swinging tail gate for closing the lower half of the rear opening to the body. This tail gate swings downwardly from a generally vertically disposed closed position to a generally horizontally disposed open position, and it is necessary that some means be provided to both check the downward swinging movement of the tail gate when it reaches open position and to support the tail gate in this position.

The check and support means of this invention is particularly intended for use with such vertically swinging station wagon tail gates, although it will be understood that it will have other uses on varied types of vehicle bodies wherein similar conditions arise. Generally the check and support means includes three links interconnecting the body side pillar structure and the side wall of the tail gate. These links are adapted to extend in end to end relationship when the tail gate is in an open position and are foldable into side by side juxtaposed relationship between the jamb face of the side pillar structure and the opposing jamb face of the tail gate when the tail gate is in a closed position. Since the links are disposed in a juxtaposed side by side relationship between the opposing jamb faces of the pillar and tail gate, the links occupy very little space in the closed position of the tail gate so as to present no additional sealing problems. However, the interior aesthetic appearance of the body is increased by concealing the links from view when the tail gate is in a closed position. Additional means are provided on the links for controlling the folding and unfolding movement of the links relative to each other whereby the check and support means of this invention operates smoothly and easily without requiring any additional effort from the operator in either opening or closing the tail gate or closure.

The primary object of this invention is to provide an improved check and support means for vehicle closures. Another object of this invention is to provide an improved check and support means for a vertically swingable vehicle closure which is operative to check movement of the closure to its open position and also to retain the closure in this position. Yet another object of this invention is to provide an improved check and support means for a vehicle closure which includes a plurality of pivotally interconnected links adapted to be disposed in an end to end extended relationship when the closure is in an open position and to be foldable into a juxtaposed side by side relationship when the closure is in a closed position.

These and other objects of this invention will be readily apparent from the following specification and drawings, wherein:

FIGURE 3 is a view similar to FIGURE 2 showing the tail gate in a partially closed position;

FIGURE 4 is an enlarged sectional view taken along the plane indicated generally by line 4—4 of FIGURE 3;

FIGURE 5 is an enlarged view of a portion of FIGURE 2;

FIGURE 6 is a sectional view taken generally along the plane indicated by line 6—6 of FIGURE 5; and FIGURE 7 is an enlarged sectional view taken along the plane indicated generally by line 7—7 of FIGURE 5.

Figure 1:
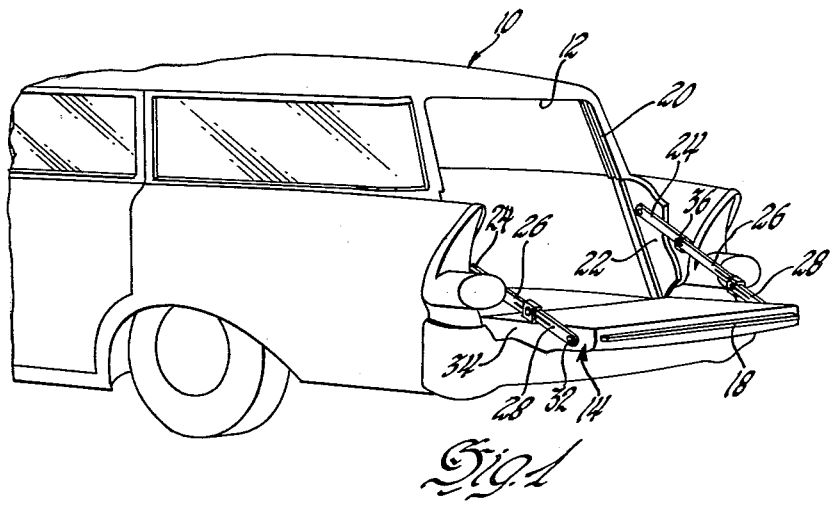
FIGURE 1 is a partial rear perspective view of a station wagon having a vertically swingable tail gate and embodying a check and support means according to this invention.
Figure 2:
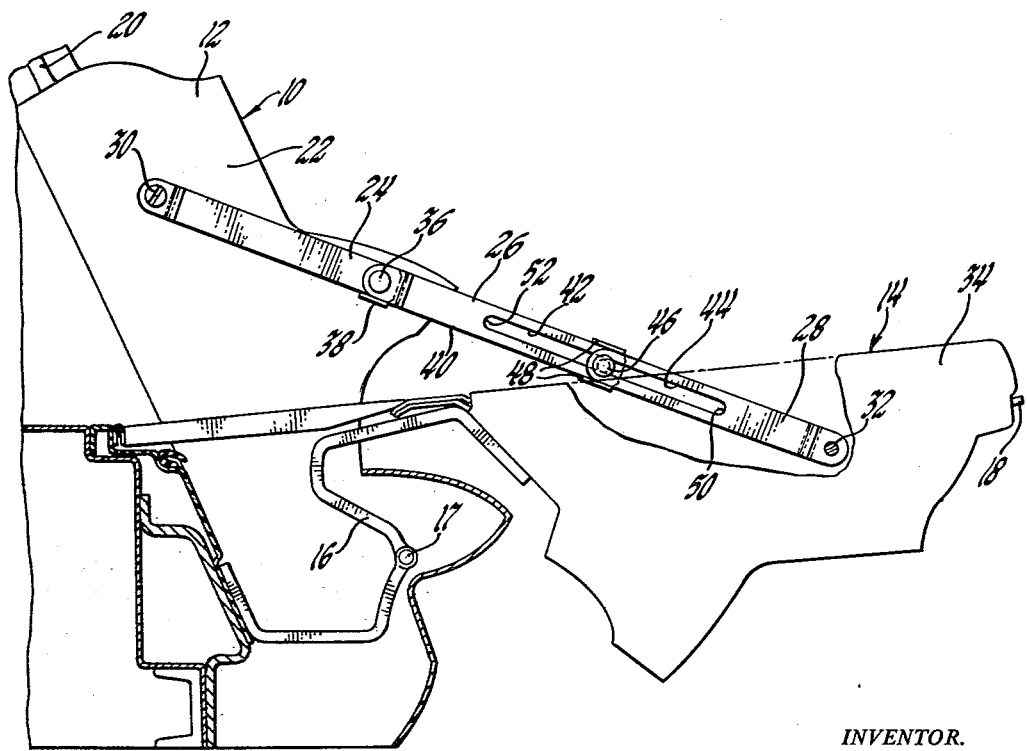
FIGURE 2 is an enlarged view of a portion of FIGURE 1.

Referring now particularly to FIGURE 1 of the drawings, a station wagon 10 includes a rear opening 12 which provides access to the interior of the body from the rearward end thereof. The lower half of opening 12 is opened and closed by a tail gate 14 which is swingably mounted on the body at the lower edge of opening 12 as by suitable spaced hinges 16, FIGURE 2 for movement about a generally horizontal axis 17. The tail gate 14 mounts a vertically movable window 18 which is adapted to be received within fixed guides 20 provided on the upper side edges of opening 12 when the tail gate is in a closed position to thereby entirely close the opening 12. The tail gate 14 is mounted on the body for movement between a closed position, not shown, wherein the tail gate is disposed in a generally vertical position between the jamb faces 22 of opening 12, and an open position, as shown in FIGURES 1 and 2, wherein the tail gate is disposed in a generally horizontal position. It can be seen that it is desirable for some means to be provided to hold the tail gate 14 in its open position and also to provide a check for the tail gate during movement to this position. This invention provides such a check and support means for vertically swinging station wagon tail gates, and this will now be described.

The check and support means generally comprises three links 24, 26 and 28 which interconnect the body and the tail gate 14. As shown in FIGURE 1 of the drawings, the check and support means may be provided at each side of the tail gate 14, although if so desired, it may only be necessary to provide the check and support means at one side of the tail gate. Since the structure is the same at each side of the tail gate, only one such structure will be described and it will be understood that the other is of the same construction. As best shown in FIGURE 2 of the drawings, one end of the link 24 is pivoted at 30 to the jamb face 22 of opening 12 and one end of the link 28 is pivoted at 32 to the jamb face of the tail gate 14. The link 26 is pivoted at 36 to the other end of the link 28 is pivoted at 32 to the jamb face 34 of provided with a laterally extending flange 38 which is adapted to engage the lower edge 40 of the link 26 to prevent any clockwise movement of the link 26 relative to the link 24 once the links 24 and 26 have been moved to an extended end to end position, as shown in FIGURES 2 and 5.

The links 26 and 28 each include a closed slot 42 and 44, respectively, and a headed stud 46 extends through each of the slots whereby the links 26 and 28 are slidable relative to each other. The link 26 further includes a pair of laterally extending flanges 48 adjacent the outer closed end of the slot 42 in order to allow sliding movement of the links 26 and 28 relative to each other but to prevent any swinging movement whatsoever of either link relative to the other. As best shown in FIGURE 7 of the drawings, the opening defined by the flanges 48 is substantially equal to the width of the link 28 so that the links are guided for generally longitudinal movement relative to each other along a straight line path without any rattling or swinging movement whatsoever.

The tail gate 14 is shown in an open position in FIGURE 2 of the drawings, and in this position it can be seen that the outer ends of the slot 42 and 44 each engage against the headed stud 46 under the action of the weight of the tail gate 14 to thereby hold the links 26 and 28 in an extended position relative to each other. Since the flanges 48 prevent any swinging movement of the links 26 and 28 relative to each other, these links must remain in their extended end to end relationship, and the engagement of the flange 38 with the lower edge 40 of link 26 prevents any clockwise swinging movement of this link relative to the link 24 whereby the links 24 and 26 are also held in end to end relationship under the action of the weight of the tail gate 14.

If the operator now desires to close the tail gate 14, he will manually grasp the tail gate and swing the tail gate upwardly toward its closed position. During the initial closing movement, the link 28 slides longitudinally of the link 26 as the slot 44 moves relative to the headed stud 46 until the inner end 50 of the slot 44 engages the stud 46. During this initial closing movement of the tail gate, the link 28 has moved from its position, as shown in FIGURE 2, to a position wherein the slot 44 is disposed over and in alignment with the slot 42. There is no swinging movement of the link 26 relative to the link 24 during this movement, since the upward swinging movement of the tail gate 14 applies a force generally longitudinal of the links 24, 26 and 28, although there is some slight swinging movement of the links about pivot 30 since the links swing about a different axis on the body than does the tail gate. Thereafter, upon continued upward swinging movement of the tail gate 14, the link 28 continues to slide longitudinally of the link 26 and the engagement of the inner end 50 of slot 44 with stud 46 moves the stud 46 from the outer end of the slot 42 to the inner end 52 thereof whereby the links 26 and 28 are now disposed in adjacent side by side juxtaposed relationship, as shown in FIGURE 3 of the drawings. Again there is no swinging movement of the link 26 relative to the link 24 during this further sliding movement of the link 28 relative to the link 26, although there is some slight swinging movement of the links as a unit about the pivot 30 of the link 24 on the body. Thus, after the tail gate 14 has been moved from a fully open position, as shown in FIGURE 2, to a paritially closed position, as shown in FIGURE 3, the links 24, 26 and 28 have swung counterclockwise as a unit about the pivot 30 from their position of FIGURE 2 to their position of FIGURE 3, while at the same time the effective length of the links has been decreased by approximately one-third, since the links are generally of the same length and the links 26 and 28 have been moved from an extended end to end relationship to a side by side juxtaposed relationship. Thereafter upon further closing movement of the tail gate 14, the link 24 swings clockwise about its pivot 30 on the jamb face 22 of the body as the links 26 and 28 swing counterclockwise as a unit about their pivots 32 on the tail gate and 36 to link 24 whereby the links 24 and 26, 28, fold over each other so that they are disposed in a generally side by side juxtaposed relationship between the jamb face 22 of the body and the jamb face 34 of the tail gate when the tail gate moves to its fully closed position. This position is indicated schematically by dot-dash lines in FIGURE 3 of the drawing.

Thus when the tail gate 14 is in its closed position, the links are disposed in a completely folded position wherein they are located in a side by side juxtaposed relationship so that they easily fit between the jamb faces of the body and of the tail gate and also occupy very little space. This naturally increases the aesthetic appearance of the interior of the body since the links are concealed from view and also does not present any unusual sealing problems between the tail gate and the body.

When the tail gate 14 is moved to an open position, the reverse action takes place, that is the links 26 and 28 initially move from their folded position with respect to the link 24 to an aligned position with respect thereto, as shown in FIGURE 3, during the initial opening movement of the tail gate, and thereafter the links 26 and 28 move to an extended position with respect to each other, as shown in FIGURE 2, when the tail gate is moved to an open position, with the successive engagement of stud 46 with the outer ends of slots 44 and 42 providing the check when the tail gate reaches a fully open position.

Thus this invention provides an improved check and support means for a vertically swingable vehicle closure.

I claim:

1. A closure check and support means for a pair of members movable relative to each other, comprising, a pair of links, each being swingably connected to one of said members, a connecting link having a slot therein, one of said pair of links having a slot therein overlying said slot in said connecting link, means extending through said overlying slots to operatively connect said connecting link to said one link for longitudinal movement of one link and connecting link relative to each other between a longitudinally extending position and a retracted juxtaposed position, and means swingably connecting said connecting link to the other of said pair of links for folding movement of said one link and connecting link as a unit when in retracted position relative to said other link to locate said one link and connecting link in juxtaposed position relative to said other link.

2. A closure check and support means for a pair of members movable relative to each other, comprising, a pair of links, each being swingably connected to one of said members, a connecting link having a slot therein, one of said pair of links having a slot therein overlying said slot in said connecting link, means extending through said slots to slidably interconnect said connecting link and said one link for longitudinal sliding movement of said one link and connecting link relative to each other between a longitudinally extending position and a retracted juxtaposed position, guide means limiting said one link and connecting link to relative longitudinal movement, and means swingably connecting said connecting link to the other of said pair of links for folding movement of said one link and connecting link as a unit when in retracted position relative to said other link to locate said one link and connecting link in juxtaposed position relative to said other link.

3. A closure check and support means for a pair of members movable relative to each other, comprising, a pair of links, each being swingably connected adjacent one end thereof to one of said members, a connecting link having a closed slot therein, one of said pair of links having a closed slot therein overlying said slot in said connecting link, a pin extending through said slots to slidably interconnect said connecting link and said one link for longitudinal sliding movement of said one link and connecting link relative to each other between a longitudinally extending position and a retracted juxtaposed position, guide means on said connecting link straddling said one link to limit said connecting link and said one link to relative longtiudinal movement, and means swingably connecting said connecting link adjacent the other end thereof to the other end of the other of said pair of links for folding movement of said one link and connecting link as a unit when in retracted position relative to said other link to locate said one link and connecting link in juxtaposed position relative to said other link.

References Cited in the file of this patent

UNITED STATES PATENTS

| | | |
|---|---|---|
| 2,071,203 | Hubbs | Feb. 16, 1937 |
| 2,538,930 | Zummach | Jan. 23, 1951 |
| 2,549,133 | Scott | Apr. 17, 1951 |
| 2,631,880 | Vigmostad | Mar. 17, 1953 |

UNITED STATES PATENT OFFICE
CERTIFICATE OF CORRECTION

Patent No. 3,064,846                                          November 20, 1962

Herman J. Thomas

It is hereby certified that error appears in the above numbered patent requiring correction and that the said Letters Patent should read as corrected below.

Column 2, line 45, after "face" insert -- 34 --; line 47, for "28 is pivoted at 32 to the jamb face 34 of" read -- 24, and the other end of the link 24 is --; column 3, line 41, for "paritially" read -- partially --; line 61, for "drawing" read -- drawings --; column 4, line 19, after "of" insert -- said --; lines 21, 37 and 56, for "extending", each occurrence, read -- extended --.

Signed and sealed this 7th day of May 1963.

(SEAL)
Attest:

ERNEST W. SWIDER                                            DAVID L. LADD
Attesting Officer                                               Commissioner of Patents